United States Patent

Shigeoka et al.

[11] Patent Number: 5,311,963
[45] Date of Patent: May 17, 1994

[54] IMPACT-SENSOR MOUNTING STRUCTURE FOR AN AUTOMOTIVE VEHICLE

[75] Inventors: Tadayuki Shigeoka; Shinpei Egawa; Makoto Tokuda; Susumu Makimoto, all of Hiroshima, Japan

[73] Assignee: Mazda Motor Corporation, Hiroshima, Japan

[21] Appl. No.: 903,224

[22] Filed: Jun. 25, 1992

[30] Foreign Application Priority Data

Jun. 25, 1991 [JP] Japan ................. 3-181753

[51] Int. Cl.$^5$ ............................... B60R 21/00
[52] U.S. Cl. ..................... 180/274; 180/282; 280/734; 200/61.44; 296/194; 293/4
[58] Field of Search ............... 280/734, 735; 180/282, 180/274, 68.6, 68.4, 291, 297; 293/4; 200/61.44, 61.45; 296/194

[56] References Cited

U.S. PATENT DOCUMENTS

| | | | |
|---|---|---|---|
| 3,848,695 | 11/1974 | Lacaze, Jr. | 280/735 |
| 3,859,482 | 1/1975 | Matsui et al. | 280/61.44 |
| 4,466,653 | 8/1984 | Harasaki | 296/194 |
| 4,828,017 | 5/1989 | Watanabe | 180/68.6 |

FOREIGN PATENT DOCUMENTS

| | | | |
|---|---|---|---|
| 472069 | 2/1992 | European Pat. Off. | 280/734 |
| 3-208780 | 9/1991 | Japan | 296/194 |
| 3-213474 | 9/1991 | Japan | 296/194 |
| WO90/03040 | 3/1990 | PCT Int'l Appl. | 180/282 |

Primary Examiner—Karin L. Tyson
Attorney, Agent, or Firm—Keck, Mahin & Cate

[57] ABSTRACT

An impact sensor is mounted to the front portion of a vehicle body so as to operate with a desired responsiveness. The impact sensor is located below a horizontal line passing through the upper end portion of a stiffener for a bumper of the vehicle and behind a vertical line passing through a front end portion of the stiffener. The stiffener is stiffer than a portion of the bumper which is located on a horizontal line passing through the stiffener. Crash energy is not transmitted to the impact sensor during a light crash and, as a result, the air bag is not inappropriately inflated during such a light crash.

5 Claims, 7 Drawing Sheets

IMPACT-SENSOR MOUNTING STRUCTURE FOR AN AUTOMOTIVE VEHICLE

BACKGROUND OF THE INVENTION

1. Field of the Invention

The present invention relates to an impact sensor mounting structure for an automotive vehicle and, more particularly, to a structure for mounting an impact sensor at a front portion of a vehicle body. The mounting structure is especially useful in a vehicle having a relatively short nose, and permits the impact sensor to sense a crash of the automotive vehicle with a desired degree of responsiveness.

2. Description of Related Art

In recent years, there has been a growing tendency to load an air bag system in an automotive vehicle as a security measure. Such an air bag system is arranged so as to absorb crash energy acting upon a driver or one or more passengers and prevent the driver, passenger or passengers from crashing into a steering wheel or front window. The air bag is expanded outward from a steering wheel or an instrument panel upon a crash of the automotive vehicle. The crash of the automotive vehicle is detected by a plurality of impact sensors mounted to the vehicle body. (See Japanese Laid-Open Utility Model Application (Kokai) No. 2(1990)-100,962).

In conventional air bag systems, it is common to use a disposable solid type of gas inflater, and to operate the gas inflater only when needed so as to decrease vehicle maintenance costs.

Typically, an impact sensor system includes a plurality of front sensors mounted to a front end portion of front frames and an approximately center portion of a shroud upper member, and in a vehicle compartment at, for example, a downward end portion of the instrument panel. This type of sensor system is generally arranged so that the compartment sensors are highly sensitive while the front sensors are less sensitive. Further, the air bag system is conventionally provided with an AND circuit arranged so as to accept two signals indicative of a car crash from at least one of the front sensors and at least one of the compartment sensors. If two such signals are accepted, a signal for expanding the air bag is generated. The sensitivity and the mounting structure of the impact sensors should be arranged so as to prevent the air bag from expanding upon a light crash which does not adversely affect the driver, the passenger or the passengers. Such a light crash, for example, may be a crash which occurs at a vehicle speed of less than 8 miles/hour. The sensitivity and mounting structure of the impact sensors, however, should also be arranged so as to expand the air bag upon a middle sized or heavy crash, since such a crash may possibly adversely affect the driver, the passenger or the passengers. Such a middle-sized or heavy crash may, for example, be a crash which occurs at a vehicle speed of more than 16 miles/hour. Conventionally, an air bag system is arranged so that those impact sensors which are mounted at approximately the center portion of the shroud upper member are located in front of or over the shroud upper member so as to prevent the crash energy from directly passing through the impact sensors. The crash energy is, for example, at least partly absorbed by a bumper. An impact sensor mounted at the shroud upper member then generates a signal indicative of the car crash only when the crash energy is higher than a predetermined level.

An impact sensor mounted to the center of a shroud upper member is arranged so that it generates a signal indicative of a crash earlier than the other front sensors when the automobile crashes into an object such as a pole or which has a portion higher than the front frames of the vehicle and projects toward the vehicle. The vehicle may, for example, collide with a utility pole at the center of its front face or with a rear end portion of a high-deck type vehicle. In this situation, it is possible that the crash will not cause the other front sensors to properly generate their respective signals, because these types of crashes tend not to transmit the crash energy into the front frame to which the other front sensors are mounted. As a result, it is clear that the sensor mounted to the center of the shroud upper member should be located above the front frames.

In recent years, to satisfy automobile design requirements, a relatively short nose type automobile has been widely adopted. The relatively short nose type automobile is designed so that a distance between a front edge of the automotive vehicle and a front edge of a front window, the length of an engine compartment in front of a passenger compartment in the longitudinal direction, and the distance between a bumper and a shroud upper member are all shortened.

An impact sensor mounted to the shroud upper member is either located in front of or over the shroud upper member. During a car crash, before the bumper absorbs crash energy sufficiently, it is possible that a part of the bumper will touch the impact sensor so that the impact sensor will generate a signal indicative of the car crash even though only a light crash has occurred.

SUMMARY OF THE INVENTION

It is a primary object of the present invention to provide a structure for mounting an impact sensor for an automotive vehicle so that the impact sensor is operated with a desired degree of responsiveness during light, middle-sized and heavy crashes.

In order to achieve this object, according to a first aspect of the present invention, an impact sensor mounting structure for an automotive vehicle, in which an impact sensor is mounted, is located at a portion of the vehicle which is approximately at the center of the vehicle body in the transverse direction, above front frames of the vehicle body, and in front of an engine.

The impact sensor mounting structure includes a bumper which is located at a front end portion of the vehicle body and absorbs impact energy, and stiffener means, located behind the bumper in a longitudinal direction of the vehicle, for providing a stiffness greater than that of a portion of the bumper which is located on a horizontal line passing through an upper end portion of the stiffener means. The impact sensor is located below a horizontal line passing through the upper end portion of the stiffener means and behind a vertical line passing through a front end portion of the stiffener means in a forward running direction of the vehicle.

The stiffener means prevents a portion of the bumper from touching the impact sensor. Hence, upon a light crash, the impact sensor is prohibited from generating signals indicative of the crash. According to yet another aspect of the present invention, the bumper is attached to a vehicle body at a securing portion, the stiffener means is located above the securing portion, and the impact sensor is located under the stiffener means.

DESCRIPTION OF THE PREFERRED EMBODIMENTS

First Embodiment (FIGS. 1-6)

Figure 1:
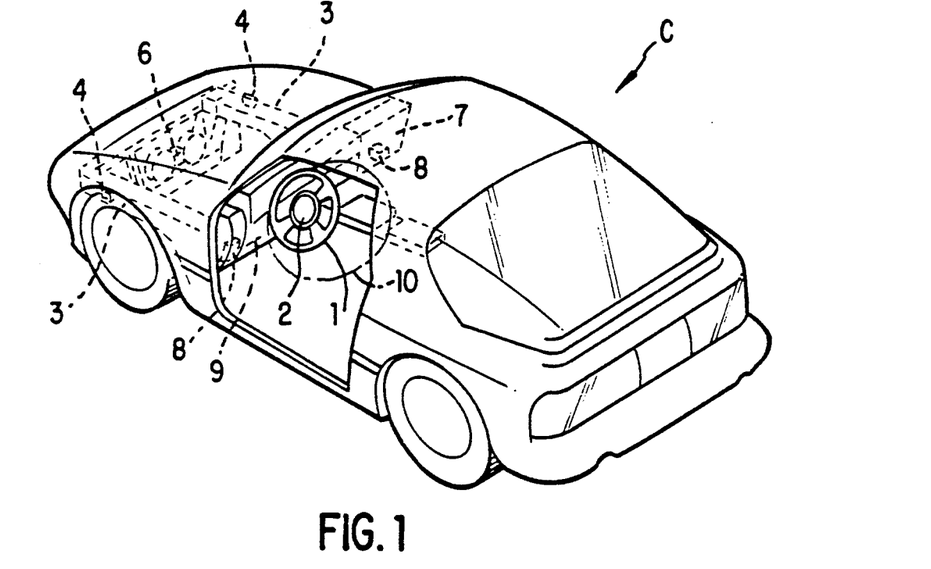
FIG. 1 is a perspective view showing a vehicle body to which the present invention is applied.

FIG. 1 shows an air bag system applied to an automotive vehicle C. The air bag system includes an air bag module 2 attached to a center portion of a steering wheel 1, a pair of first impact sensors 4 attached to sides of a pair of front frames 3, a second impact sensor 6 attached to approximately the upper end and center of a front end portion of the vehicle C, a pair of third impact sensors 8 attached to a lower end portion of an instrument panel 7, and a control box 9 operating the air bag module 2 in accordance with signals generated from the impact sensors 4, 6 and 8.

The air bag module 2 includes an igniter, an inflator, and an air bag 10. When the igniter is operated by a signal from the control box 10, the inflator is fired, sending out a large quantity of gas. Then, the gas inflates the air bag 10, as illustrated by the dot-dash line in FIG. 1.

Figure 2:
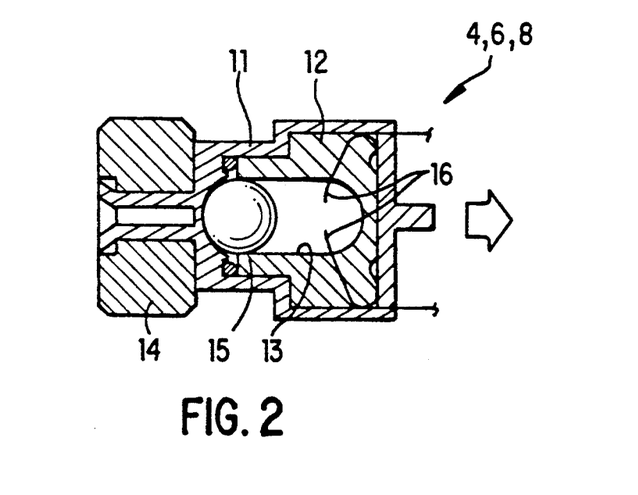
FIG. 2 is a vertical sectional view showing a mass damping type of sensor as a representative example of a conventional impact sensor.

FIG. 2 shows a cross-section of an impact sensor; each of the impact sensors 4, 6 and 8 is constructed in the manner shown in FIG. 2. The illustrated impact sensor includes holders 11 and 12, approximately cylindrical storage space 13 formed in the holders 11 and 12, a magnet 14, a steel ball 15 which is acted on or "pulled by" the magnet 14, and a pair of electrodes 16. Usually, the steel ball 15 is positioned to one side of the storage space 13, as illustrated in FIG. 2. When a crash occurs, the steel ball 15 moves, in the forward running direction of the vehicle C, to the other side of the storage space 13. The steel ball 15 then electrically connects the electrodes 16. The impact sensors 4, 6 and 8 are attached to the vehicle in such a fashion that a center line of the space 13 is oriented in the longitudinal direction of the vehicle C. The magnet 14 is positioned in the rearward direction of the vehicle C relative to the rest of the impact sensor structure. The sensitivity of each impact sensor may be changed by altering the mass of its steel ball 15.

The steel ball masses of the first and second impact sensors 4 and 6 are less than the masses of the steel balls of the third impact sensors 8. When at least one of the three sensors 4 and 6 and at least one of the two sensors 8 transmit electric current to the control box 9, the control box transmits a signal indicative of a crash to the igniter of the air bag module 2. The air bag 10 is then inflated.

Figure 3:
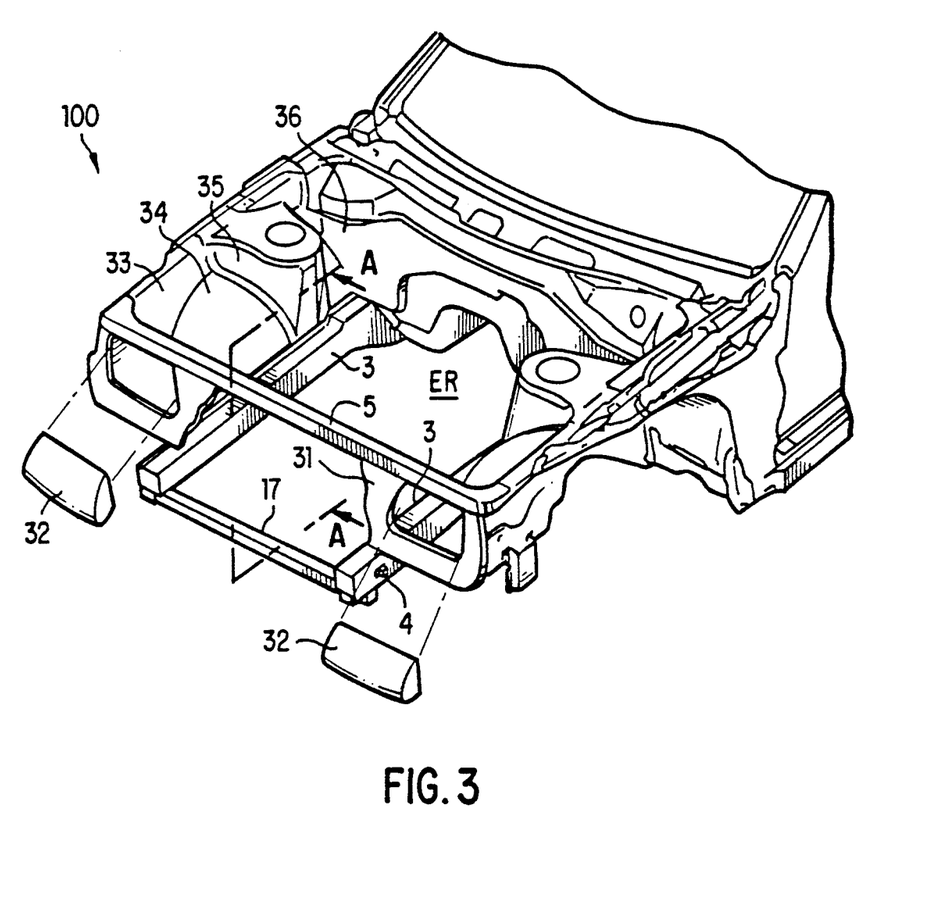
FIG. 3 is a perspective view showing the front portion of a vehicle to which the present invention is applied.

FIG. 3 is a perspective view showing a front portion of a vehicle body to which the impact sensor mounting structure according to the first embodiment of the present invention is applied. As noted above, FIG. 4 is a sectional view of the front portion of the vehicle body as seen along line A—A of FIG. 3.

Figure 4:
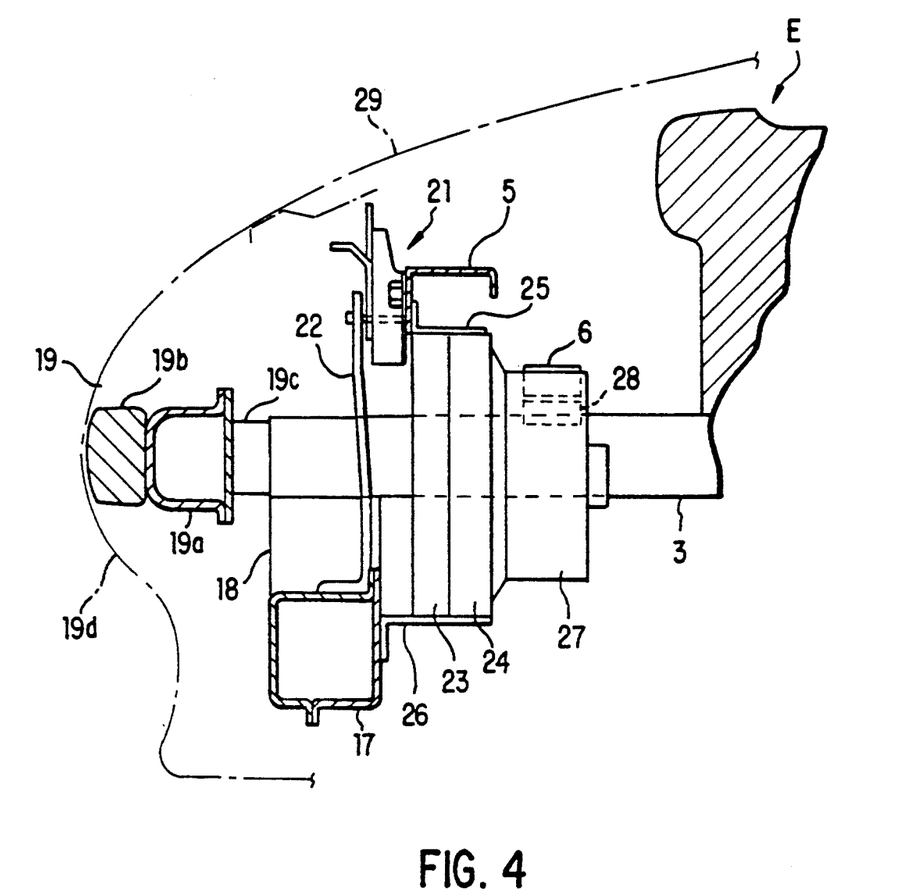
FIG. 4 is a sectional view showing a first embodiment of the present invention as seen along line A—A of FIG. 3.

The front portion 100 of the vehicle body has a pair of left-hand and right-hand front frames 3 extending in a longitudinal direction of the vehicle body. A bumper 19 is mounted, through stay 19c, to a front end face of each of the front frames 3. The front bumper 19 includes an energy absorbing portion 19b made from rubber or the like, a bumper reinforcement 19a extending in a transverse direction of the vehicle body, and a bumper face 19d made from ABS plastic or the like. Between the left-hand and right-hand front frames 3, a cross member 17 is interposed. The cross member 17, in turn, is connected to a bottom face of each of the front frames 3 through a connector 18.

To the front end portion of each front frame 3 is connected a shroud panel 31. The shroud panel 31 is disposed so that it extends in the transverse direction of the vehicle body and constitutes a front wall of an engine room ER. An engine E is disposed in the engine room ER. Head lamps 32 are attached to the shroud panel 31 by bolts and nuts. A shroud upper member 5 is connected to the upper end portion of the shroud panel 31. The shroud upper member 5, in turn, is disposed so that it extends in the transverse direction of the vehicle body. Each of the side walls of the engine room ER is formed of a wheel apron 33, which extends from a corresponding part of the shroud panel 31 toward the rear portion of the engine room ER. Each wheel apron has a lower end connected to the corresponding front frame 3. Additionally, each of the wheel aprons 33 is provided with a wheel housing 34, projecting toward the inside of the engine room ER, and a suspension tower 35 for a suspension damper (not shown).

To an upper face of the rear end portion of the front frame 3 is connected a dash panel 36. The dash panel 36 extends over the entire width of the vehicle body, and both defines the engine room ER and divides it from the passenger compartment.

The front portion 100 of the vehicle body is provided with the first impact sensor 4 mounted to a side face of the front frame 3.

Figure 5:
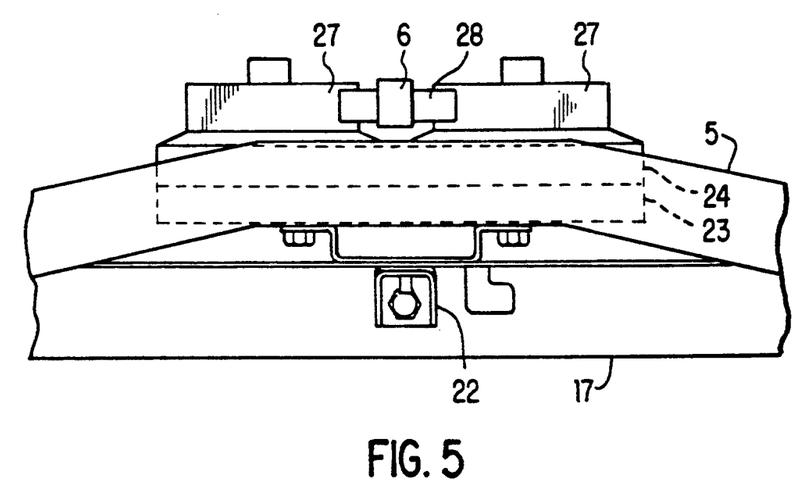
FIG. 5 is a plan view showing a front portion of the vehicle body of the first embodiment.
Figure 6:
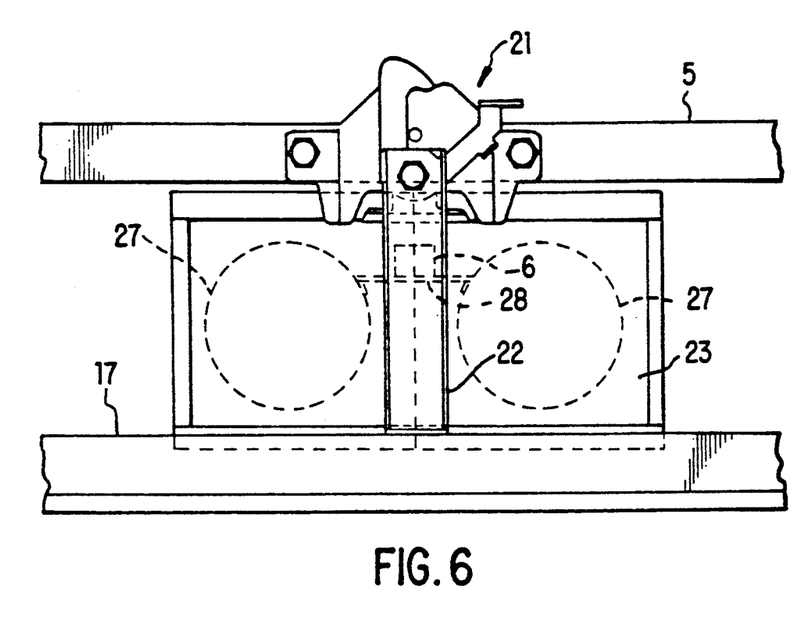
FIG. 6 is a front view showing the front portion of the vehicle body of the first embodiment.

As noted previously, FIG. 5 is a plan view and FIG. 6 is a front view of a front portion of the vehicle body according to the first embodiment of the present invention.

At the center portion of the shroud upper member, in the transverse direction of the vehicle body, a hood lock apparatus 21 is positioned. The hood lock apparatus is made of a thick steel sheet and is stiffer than a portion of the bumper face 19d in front of the hood lock apparatus 21 horizontally aligned therewith. A center member or stiffener member 22 is connected between the hood lock apparatus 21 and the cross member 17. The center member is a channel-shaped steel element and is stiffer than the section or portion of the bumper face 19d lying on the centerline of the automotive vehicle.

Below the shroud upper member 5 are positioned heat exchangers formed by a condenser 23 for an air conditioning system and a radiator 24 for an engine cooling system. These heat exchangers are connected to the shroud upper member 5 and the cross member 17 by stays 25 and 26 and are stiffer than the bumper face 19d. Behind the radiator 24 is positioned a pair of fan cowlings 27, in which cooling fans, driven by electric motors (not shown), are located. A mounting plate 28 is connected to the fan cowlings 27. The second impact sensor 6 is connected to the mounting plate 28. The second sensor 6 is then positioned behind the condenser 23, the radiator 24 and the shroud upper member 5.

The structure of mounting plate 28 is changeable so as to be adaptable for a vehicle which has only one fan cowling 27 by attaching the mounting plate 28 to the top of the fan cowling 27. Reference number 29 designates a engine hood, and reference character E designates an engine of the vehicle.

Figure 7:
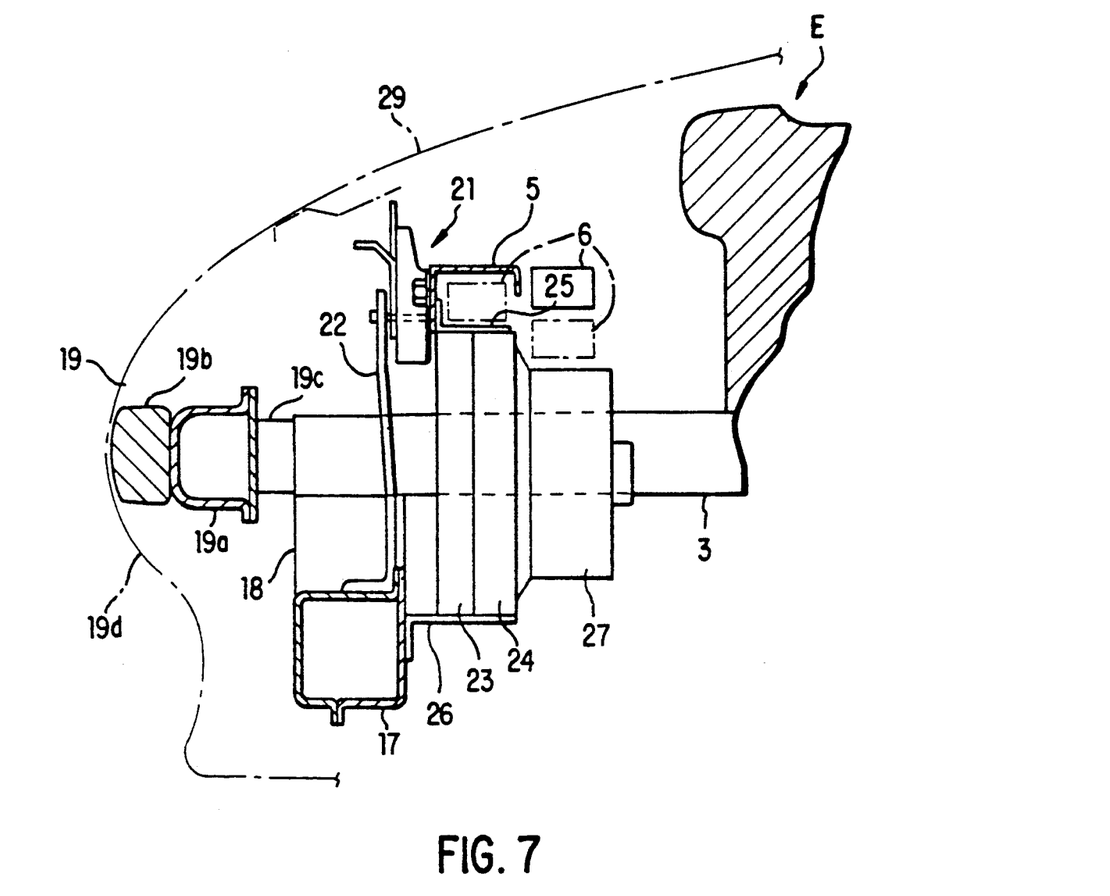
FIG. 7 is a sectional view showing a second embodiment of the present invention as seen along line A—A of FIG. 3.
Figure 8:
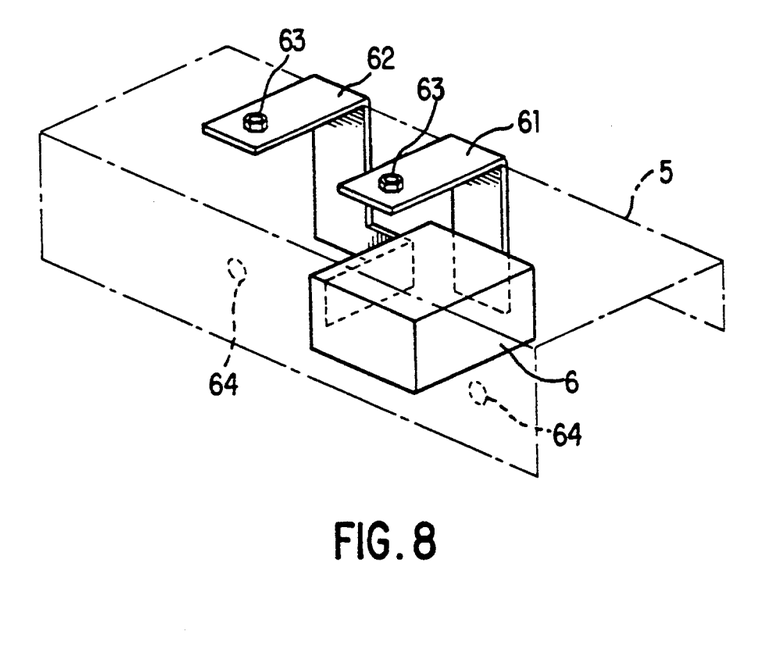
FIG. 8 is a perspective view showing attachments of the second embodiment of the present invention.

Second, Third and Fourth Embodiments (FIGS. 7–8)

FIG. 7 is a sectional view showing a front portion of a vehicle body to which an impact sensor mounting structure according to the second, third and fourth embodiments of the present invention may be applied. FIG. 7 is a view along line A—A of FIG. 3 similar to FIG. 4, and provides a perspective view of the second impact sensor mounting structure.

In this description, the same portions and elements of the first, second, third and fourth embodiments are indicated by the same reference numbers in FIGS. 4–8, and no further explanation of these portions and elements is provided.

In the second embodiment, the second impact sensor 6 is mounted at position behind the center portion of the shroud upper member 5 in the transverse direction of the vehicle C. This is represented by a solid line in FIG. 7.

In the third embodiment, the second impact sensor 6 is mounted at a position below the center portion of the shroud upper member 5 in the transverse direction of the vehicle C. This is shown as a one dot-dash line in FIG. 7. The impact sensor is attached to the shroud upper member by a first stay 61 and second stay 62. The stays 61 and 62 are attached to the second impact sensor by adhesive and to the shroud upper member 5 by bolts and nuts 63. Numbers 64 designate holes for mounting the hood locking mechanism.

In the fourth embodiment, the second impact sensor 6 is mounted at position below and behind the center portion of the upper shroud member 5 in the transverse direction of the vehicle C. This is shown as a two dot-dash line in FIG. 7.

Figure 9:
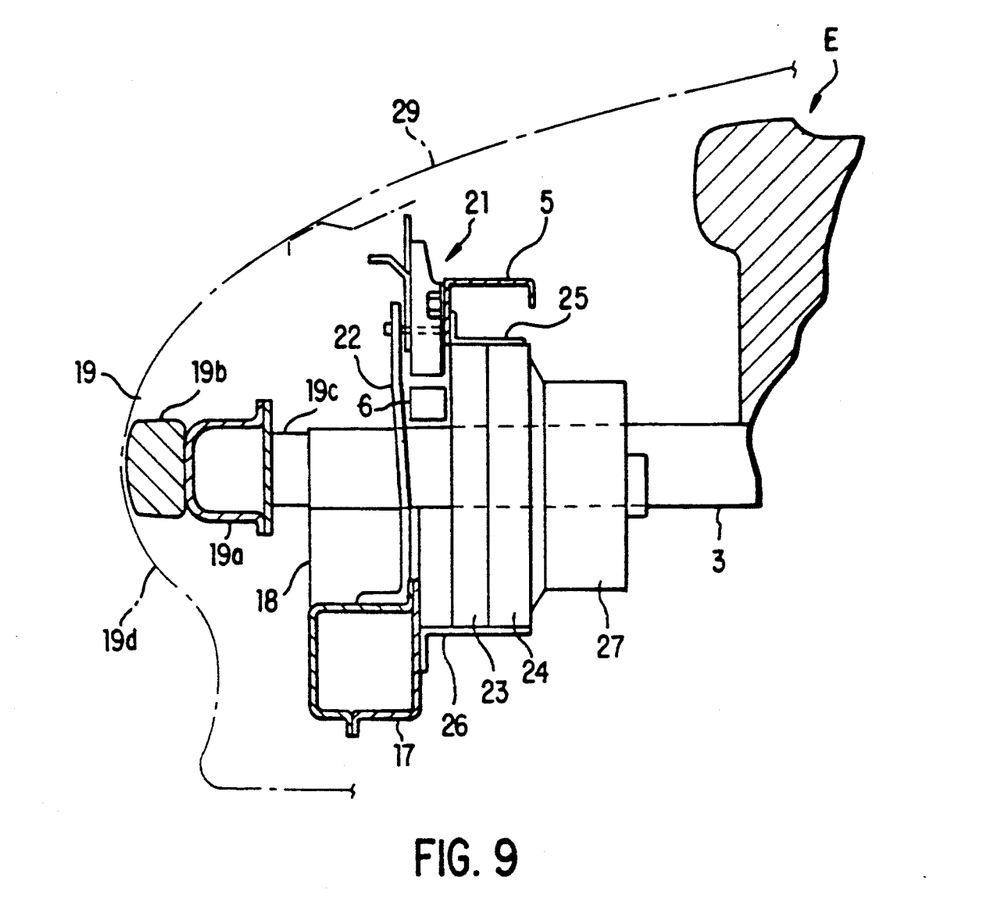
FIG. 9 is a sectional view shown a third embodiment of the present invention as seen along line A—A of FIG. 3.

Fifth Embodiment (FIG. 9)

FIG. 9 is a sectional view showing a front portion of a vehicle body to which the impact sensor mounting structure according to the fifth embodiment of the present invention may be applied. FIG. 9 is a view along line A—A of FIG. 3 similar to FIG. 4, and provides a perspective view of the second impact sensor mounting structure.

In this description, the same portions and elements of the first and fifth embodiment are indicated by the same numbers in FIGS. 4–6 and 9, and no further explanation of these portions and elements is provided.

The second impact sensor 6 is mounted, at a position which is behind the center member 22 and below the hood lock apparatus 21, to the shroud upper member 5 or the condenser 23 by a proper mounting structure (not shown).

The present invention may be embodied in other specific forms without departing from the spirit and scope of the invention. The present embodiments, as described above, are to be considered in all respects as illustrative. The scope of the invention is defined by the appended claims, and all changes, modifications and variations which come either literally within or in the range of equivalents to the claims are intended to be encompassed.

What is claimed is:

1. A front structure for a short nose automobile vehicle comprising:
    a pair of horizontally extending elongated front frame members extending in the longitudinal direction of the automobile vehicle from front to back and being in parallel spaced relationship on opposite sides of a longitudinal centerline of the automobile vehicle;
    a cross member fixed to the bottom of the forward end portions of the frame members;
    a front bumper extending transversely of the automobile vehicle and being composed of a rigid bumper reinforcement and an energy absorbing material mounted on the forward side of the rigid bumper reinforcement;
    a stay, said stay fixing the rigid bumper reinforcement to the forward end of each of said front frame members;
    a vertically oriented rigid shroud panel extending transversely across the automobile vehicle to define the forward end of the automobile vehicle engine room, the bottom part of said shroud panel being fixed to the front frame members;
    a rigid shroud member extending transversely across the automobile vehicle and being fixed to the upper part of said shroud panel;
    a stiffener member extending vertically on the centerline of the automobile vehicle and fixed at its lower portion to the cross member and at its upper portion to the rigid shroud member, said stiffener member having greater stiffness than the forward end of the bumper; and
    an impact sensor mounted on the rigid shroud member on the centerline of the automobile vehicle, behind the stiffener member, below the top end of the stiffener member and vertically spaced above the horizontal level of the front bumper.

2. A front structure according to claim 1 wherein the impact sensor is mounted directly on the rigid shroud member.

3. A front structure according to claim 1 and further comprising an intermediate structure provided between the impact sensor and the rigid shroud member to which the impact sensor is connected.

4. A front structure according to claim 3 wherein the intermediate structure is a heat exchanger.

5. A front structure according to claim 3 wherein the intermediate structure is a fan cowling.

* * * * *